Jan. 11, 1955
F. M. SPAYD
2,699,181
QUICK DISCONNECT VALVE
Filed Dec. 23, 1949
2 Sheets-Sheet 1
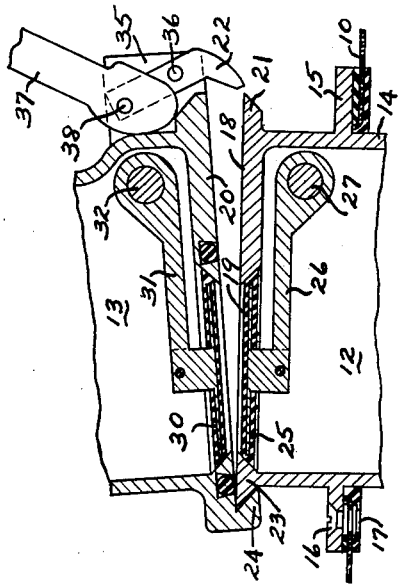
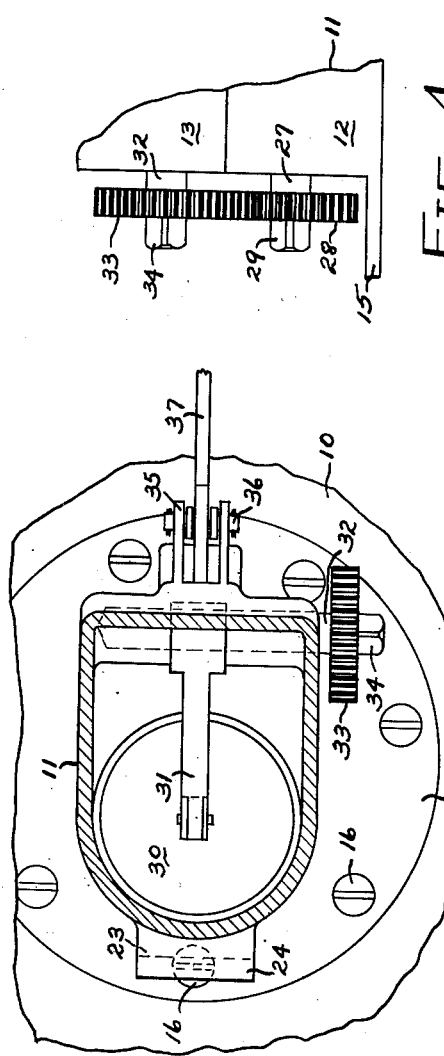
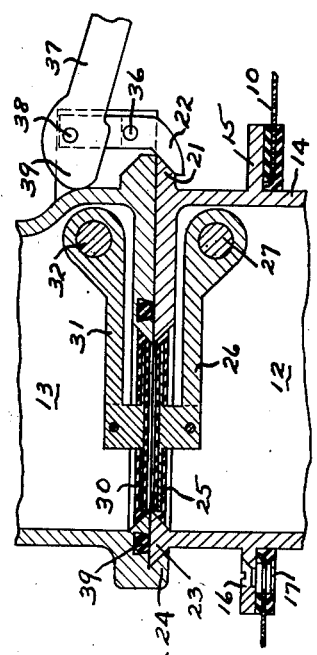
INVENTOR:
FRED M. SPAYD, DECEASED, BY.
J. W. HATFIELD, ADMINISTRATOR
BY

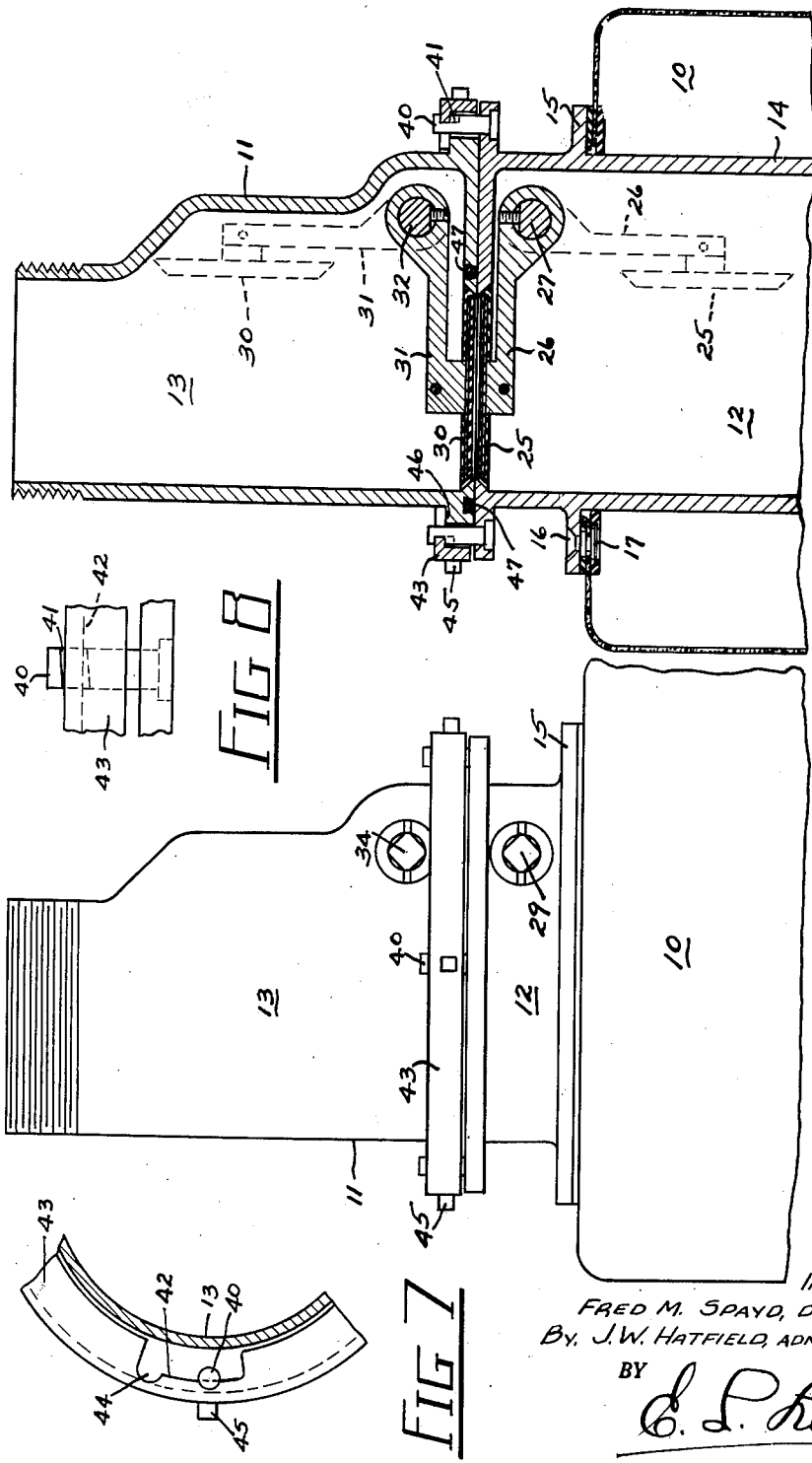

United States Patent Office 2,699,181
Patented Jan. 11, 1955

2,699,181

QUICK DISCONNECT VALVE

Fred M. Spayd, deceased, late of Dayton, Ohio, by Joseph W. Hatfield, administrator, Dayton, Ohio, assignor to Spayd Metal Products Corporation, Dayton, Ohio, a corporation of Ohio Application December 23, 1949, Serial No. 134,654

1 Claim. (Cl. 137—614)

The present invention relates to valves, and more particularly deals with valves of the quick disconnect type.

The valves of the present invention may be used for a variety of purposes. For example, they may be used on separable section pipe lines of the flexible and inflexible types; on tank cars and tank trucks such as are used for carrying and distributing fuels, lubricants, food products, industrial wastes, and the like; on stationary storage tanks; on fuel cells of the permanent and collapsible types; and on many other types of containers and transporting means, as those skilled in the art will readily appreciate.

The valves of the present invention are characterized by the fact that, upon disconnect, both sections thereof may be maintained selectively in open or closed position. Another characteristic of the valves of the present invention is the ease with which they may be separated and engaged. They are simple in construction, foolproof in operation, economical in use, and when open cause a minimum of turbulence and loss of head because of the mode and manner in which the internal parts thereof are arranged and disposed.

The present invention, and the manner in which it may be used advantageously in certain specific forms thereof, will be fully comprehended and ascertained from the following description taken in connection with the annexed drawings, wherein:

Fig. 1 is a fragmentary cross-sectional view of a valve according to one form of the present invention, shown with the two separable sections in engagement and the closure means in closed position;

Fig. 2 is a framgentary plan view, partly in cross-section, looking downwardly;

Fig. 3 is a view similar to Fig. 1 indicating the manner in which the two separable sections are engaged;

Fig. 4 is an enlarged fragmentary view showing the manner in which the closure means are opened and closed selectively in unison;

Fig. 5 is an elevational view of one form of the valve of the present invention mounted on a container;

Fig. 6 is an elevational cross-sectional view of the showing of Fig. 5;

Fig. 7 is an enlarged detail view showing the manner of engagement of the two sections in one form of the present invention; and Fig. 8 is another detail view showing, in enlargement, the manner of engagement of the two sections in the form of the invention illustrated in Figs. 5 to 7.

Referring now to the drawings in detail, Figs. 1 to 4 illustrate one form of the present invention. Therein, the numeral 10 designates a container such as a fuel cell made of impregnated fabric or the like, having mounted thereon a quick disconnect valve generally designated by the numeral 11 and comprising a lower section 12 and an upper section 13.

The lower section 12 is provided with a nozzle 14 protruding into the container 10, and this nozzle 14 is provided with a flange 15 arranged to be mounted on said container by means of a plurality of screws 16 arranged for cooperation with screw receiving means 17 mounted on the wall of said container 10.

The body of the valve 11 is in the shape of an elongated D provided with a circular opening for the flow of fluid therethrough at a point adjacent the rounded portion of the D.

Along the top of the lower section 12 there is provided a shelf-like member 18 forming a portion of the valve seat 19 on the lower section 12, and arranged to cooperate in sealing engagement with a similar shelf-like member 20 forming part of the upper section 13. The member 18 extends outwardly as well to form a latch receiving protrusion 21 arranged to receive a latch 22 in locking engagement.

At a point opposite the member 18 there is provided another member 23 in the form of an inverted triangle, the inner side of which forms a part of the valve seat in the lower section 12, and the outer side of which forms a hook receiving prong arranged to cooperate in locking engagement with a hook-like member 24 which forms part of the upper section 13.

The lower section 12 is provided with a valve disc 25 mounted on a swingable arm 26 which in turn is mounted fixedly on a shaft 27 which extends outwardly through the casing of the lower section 12 and is provided with a gear 28 fixedly mounted thereon. The shaft 27 is also provided with a tool receiving head 29 arranged to receive a tool adapted to move the valve disc 25 carried by the arm 26 and the shaft 27 selectively to an open or closed position, as desired.

The upper section 13 is likewise provided with a valve disc 30 mounted on a swingable arm 31 which in turn is mounted fixedly on a shaft 32 which extends outwardly through the casing of the upper section 13 and is provided with a gear 33 fixedly mounted thereon arranged to mesh with the gear 28 mounted on the shaft 27 for coaction therewith. The shaft 32 is also provided with a tool receiving head 34 arranged to receive a tool adapted to move the valve disc 30 carried by the arm 31 and the shaft 32 selectively to an open or closed position, as desired. Obviously, the turning of either the tool receiving head 29 or 34 will move both valve discs 25 and 30, since the gears 28 and 33 are meshed.

A bifurcate member 35 extends outwardly from the upper section 13. A latch 22 is swingably mounted thereon by means of a stud 36. A handle 37 is swingably mounted on the latch 22 by means of a rivet 38, and said handle is provided with a head portion 39 mounted eccentric, so that when the handle 37 is lowered as in Fig. 1 the latch 22 is forced tightly into engagement with the shoulder 21 whereby to form a lock therewith, while when the handle 37 is lifted as in Fig. 2 the latch 22 is forced to move outwardly away from the shoulder 21, whereby the sections 12 and 13 may be readily and easily separated. As noted in Fig. 2, the hook 24 separates from the member 23 as the handle 37 is lifted, thus separating the latch 22 and the shoulder 21. This is essentially the means whereby the sections 12 and 13 are separated; and they are joined by reversing the process: that is to say, by first placing the hook 24 over the projecting portion of the member 23, then lowering the opposite side of the section 13 over and onto the section 12, and then moving the handle 37 downwardly, whereby to engage the latch 22 and the shoulder 21, thus forming the sealing engagement. The O-ring 39 serves to produce a seal between the section 12 and the section 13.

Referring now to Figs. 5 to 8 of the drawings, it will be noted that this form of the invention differs from that illustrated in Figs. 1 to 4 primarily in the means for locking and unlocking the upper section and the lower section of the valve; therefore, in describing the form of Figs. 5 to 8 reference will be made only to the locking mechanism.

The numeral 40 designates a plurality of lugs mounted along the outer periphery of the lower section of the valve. The lugs 40 are provided with inclined slots 41 arranged to receive the inner lip 42 of an angle ring 43. The angle ring 43 is notched along the top side thereof, as at 44, to receive the studs 40. In operation, the angle ring 43 is positioned over the lugs 40 so that each of the lugs 40 passes through a corresponding notch 44. This brings the inner lip of the angle ring 43 into alignment with the inclined slots 41 of the lugs 40. On turning the angle ring 43 clockwise, as by engaging a suitable tool on the protrusions 45 of the angle ring 43, the inner lip 42 of the angle ring 43 is caused to enter the inclined notch 41 of the lugs 40. As pressure is exerted through the turning of the angle ring 43 clockwise, as the inner lip 42 moves downwardly along the notch 41 of the lugs 40, in bayonet engagement, the angle ring 43 will be forced down against the shoulder 46 of the upper section of the valve, and the upper section in turn will be forced down against the face of the lower section of the valve, thus compressing the O-ring 47 and forming a tight seal between the sections.

The two sections of the valve are separated by merely reversing the procedure; that is to say, by turning the angle ring 43 counterclockwise, thus lifting the angle ring 43 away from the shoulder 46 of the upper section, and releasing the pressure on the O-ring 47 which forms the seal with the lower section of the valve.

The form of the present invention illustrated in Figs. 5 to 8 differs also from that illustrated in Figs. 1 to 4 in that in the former embodiment each of the valve discs may be operated separately due to the fact that no gears interconnect the two shafts carrying the disc mounting arms. Of course, if it were desired, the embodiment of Figs. 5 to 8 could be provided with such gears substantially in the manner illustrated in the embodiment of Figs. 1 to 4; and in like manner the latter embodiment could be provided without such gears, so that it would be possible to operate each of the valve discs separately.

In Fig. 6 there is illustrated by means of dotted lines the position of the discs and carrying arms when the valve is in open position. It will be noted that none of the operating mechanism interferes with the free flow of fluid through the valve, thus insuring a minimum of turbulence and loss of head.

It is well to point out that the valves of the present invention hold tight whether or not the two sections are joined or separated; that is to say, it is possible to separate the two sections and maintain pressure on each.

While the embodiments of the present invention illustrated in the drawings provide "in line" flow, it is well to point out that, as those skilled in the art will fully appreciate, the valve of the present invention may be and has been provided for angular flow; that is to say, either the inlet or discharge ports may be arranged at any angle desired; and in such further modifications either of the locking means herein described and shown in the drawings may be employed successfully and with full satisfaction.

It is also well to point out that while both of the forms illustrated show a threaded outlet connection, a flanged or other connection may be used with equal satisfaction, since the manner of connection the outlet has no bearing on the invention. However, when the valve of the present invention is used on stationary pipelines and the like, flanged connections are provided at both ends, since this permits installation and removal of the valve in the same manner and with the same tools generally used for other types of valves.

In the drawings, the valve of this invention has been shown installed on a fuel cell and provided with an inwardly extending nozzle. The use of this nozzle is beneficial and advantageous when the valve is used on such containers and other collapsible type containers, but obviously a normal flange or screw connection may be used when the valve is installed in other types of containers, such as tankcars and tank trucks. However, when a normal flange or screw connection is employed, the length of the casing of the lower section must be sufficiently great to permit opening of the valve with the disc within the casing; in other words, the length of the casing above the flange or screw connection must be sufficient to permit the disc and arm to swing open within the length of the casing.

The arms carrying the discs may be spring loaded to maintain the disc in closed position or in open position, as may be most advantageous. When the two sections are separated, the disc has a tendency to remain in closed position, particularly if the disc is under hydrostatic head, so that in most instances spring loading is not necessary; however, it may be and has been used successfully where so desired.

The valve of this invention finds use in many industrial and military operations, as those skilled in the art will readily appreciate. As typical of the latter, its use in collapsible fuel cells may be mentioned. These cells are filled from tank ships and towed onto beaches or up shallow streams. The fuel is then transferred to smaller containers to be transported as and where desired or required. Obviously, the valve of this invention proves particularly valuable in such use, since it can be readily connected and disconnected.

While there have been described herein and illustrated in the drawing certain specific embodiments of the present invention, this has been done solely by way of explanation and illustration of typical forms of the invention, and it is not intended thereby to have the present invention limited to or circumscribed by the specific details of construction, arrangement of parts, materials, procedures or methods herein described or illustrated in the drawings, since the present invention is susceptible to modification according to individual preference and conditions within the scope of the appended claim.

I claim:

A valve comprising two separable valve bodies each provided with a valve seat adapted to be aligned with the valve seat in the other said body, a valve disk arranged for sealing engagement with each of said valve seats, an actuating arm arranged to move each of said valve disks to open position wherein said disks are displaced from alignment with said seats and are removed from the path of fluid flowing through said seats, a rotary shaft in each of said bodies forming a mounting for the associated said arm to move said arm and the associated said disk into and out of sealing engagement with the corresponding valve seat, gear means on each said shaft meshing with the gear means on the other said shaft, and means for rotating one of said shafts to cause corresponding rotation of the other said shaft in unison therewith and synchronizing of the opening and closing of both said valves.

References Cited in the file of this patent

UNITED STATES PATENTS

| | | |
|---|---|---|
| 1,304,519 | Walker | May 20, 1919 |
| 2,120,677 | Oliver | June 14, 1938 |
| 2,221,269 | Sertillange | Nov. 12, 1940 |
| 2,300,483 | Berger | Nov. 3, 1942 |
| 2,338,953 | Melke | Jan. 11, 1944 |
| 2,543,589 | Newcomb | Feb. 27, 1951 |

FOREIGN PATENTS

| | | |
|---|---|---|
| 3,930 | Great Britain | of 1913 |